(12) United States Patent
Tsan et al.

(10) Patent No.: US 7,457,041 B2
(45) Date of Patent: Nov. 25, 2008

(54) HEAD-MOUNTED DISPLAY AND IMAGE ADJUSTMENT METHOD FOR THE SAME

(75) Inventors: Shu Mei Tsan, Tainan County (TW); Kuo Yuin Li, Tainan County (TW)

(73) Assignee: Himax Display, Inc. (TW)

( * ) Notice: Subject to any disclaimer, the term of this patent is extended or adjusted under 35 U.S.C. 154(b) by 0 days.

(21) Appl. No.: 11/759,117

(22) Filed: Jun. 6, 2007

(65) Prior Publication Data

US 2007/0285795 A1    Dec. 13, 2007

(30) Foreign Application Priority Data

Jun. 7, 2006  (TW) .............................. 95120171 A

(51) Int. Cl.
*G02B 27/14* (2006.01)
*G02F 1/1335* (2006.01)
*G02F 1/13* (2006.01)

(52) U.S. Cl. .......................... 359/630; 345/11; 345/202

(58) Field of Classification Search ................ 359/630, 359/631; 349/8, 11, 13, 75, 76, 202
See application file for complete search history.

(56) References Cited

U.S. PATENT DOCUMENTS

| | | | | | |
|---|---|---|---|---|---|
| 5,579,026 A | * | 11/1996 | Tabata | ............................ | 345/8 |
| 5,978,015 A | * | 11/1999 | Ishibashi et al. | .............. | 348/47 |
| 6,064,353 A | * | 5/2000 | Hoshi | ............................. | 345/7 |
| 6,151,061 A | * | 11/2000 | Tokuhashi | ................... | 348/51 |
| 6,507,359 B1 | * | 1/2003 | Muramoto et al. | ........... | 348/47 |
| 6,657,602 B2 | * | 12/2003 | Endo et al. | ..................... | 345/8 |
| 2007/0285346 A1 | * | 12/2007 | Li | ................................ | 345/8 |

* cited by examiner

*Primary Examiner*—David N Spector

(57) ABSTRACT

A head mounted display includes two imaging apparatuses and at least one optical compensator. The imaging apparatuses can form two virtual images respectively in front of two eyes of a user. The optical compensator can modulate wavefront of the image beams of the virtual images so as to adjust the positions of the virtual images. In this manner, the positions of the two virtual images can be adjusted to substantially coincide with each other. The present invention also provides an image adjustment method for a head-mounted display.

13 Claims, 6 Drawing Sheets

HEAD-MOUNTED DISPLAY AND IMAGE ADJUSTMENT METHOD FOR THE SAME

CROSS REFERENCE TO RELATED APPLICATION

This application claims the priority benefit of Taiwan Patent Application Serial Number 095120171, filed on Jun. 7, 2006, the full disclosure of which is incorporated herein by reference.

BACKGROUND OF THE INVENTION

1. Field of the Invention

This invention generally relates to a head-mounted display, and more particularly, to a binocular head-mounted display and an image adjustment method for the same, wherein the position of the virtual image generated by the display is adjusted by optical compensation.

2. Description of the Related Art

A conventional binocular head-mounted display 80 includes two image apparatuses which can respectively form two virtual images LI and RI in front of two eyes of a user 90, as shown in FIG. 1a, wherein LI denotes the virtual image formed in front of the left eye of the user 90 and RI denotes the virtual image formed in front of the right eye of the user 90, and the two virtual images LI and RI together form a combined virtual image to be seen by the user 90. Due to the manufacturing tolerances of mechanisms and optical elements, e.g. a reasonable manufacturing tolerance of a mechanism is generally larger than 0.05 mm, dipvergence and convergence may exist between the virtual images LI and RI formed in front of two eyes of the user 90, as shown in FIG 1b. Although human eyes normally have the ability to automatically correct two virtual images which are within an acceptable tolerance range to substantially coincide with each other such that only one combined virtual image will be seen by the user 90. However, when the user 90 utilizes an uncorrected head-mounted display for a long period of time, it may cause a burden to the eyes thereby introducing amblyopia, headache and nausea etc. to the user 90. In order to solve the dipvergence and convergence problems existing in the conventional head-mounted display, makers have to manufacture molds with much higher precision, or to dispose additional mechanical adjusting mechanisms on the binocular head-mounted display 80 so as to adjust positions of the virtual images LI and RI formed in front of two eyes of the user 90. However, the additional mechanical adjusting mechanisms may not only increase the total weight and the complexity of the optical engine of the head-mounted display 80 thereby causing burden and inconvenience to the user 90 while using the product, but also increase the manufacturing cost thereof.

According to the above reasons, it is necessary to improve the conventional binocular head-mounted display and image adjustment method for the same so as to solve the problems existing in the related art.

SUMMARY OF THE INVENTION

It is an object of the present invention to provide a head-mounted display and image adjustment method for the same, wherein an optical compensator is utilized to modulate the wavefront of the image beams of the virtual images by means of circuit designs for adjusting positions of the virtual images, thereby decreasing the complexity and the manufacturing cost of the display.

It is another object of the present invention to provide an optical compensator for adjusting positions of the virtual images formed by a head-mounted display. The optical compensator modulates the wavefront of the image beams of the virtual images to alter optical paths of the image beams of the virtual images. The wavefront of the image beams of the virtual images are modulated by changing the optical path difference of the image beams based on the characteristics that the refractive index of liquid crystals is changed with the voltage field applied thereto.

In order to achieve above objects, the head-mounted display of the present invention mainly includes a frame, first and second imaging apparatuses and an optical compensator. The frame is wearable on a user's head. The first and the second imaging apparatuses are integrated on the frame for respectively creating a first virtual image and a second virtual image. The optical compensator is disposed in the optical path between the first imaging apparatus and one eye of the user for modulating the wavefront of the image beams of the first virtual image. The optical compensator comprises a first transparent substrate, a second transparent substrate and a liquid crystal layer sandwiched therebetween; a plurality of electric field regions are formed in line and adjacent with each other between the first and the second transparent substrates.

According to another aspect of the present invention, the optical compensator includes a first transparent substrate, a second transparent substrate, a liquid crystal layer sandwiched between the first and the second transparent substrates, and a control circuit for creating a plurality of electric field regions formed in line and adjacent with each other between the first and the second transparent substrates, wherein the field intensities of the adjacent electric field regions increase or decrease monotonically.

The present invention further provides an image adjustment method for a head-mounted display including the steps of: providing a head-mounted display, which has a frame, two imaging apparatuses integrated on the frame, and an optical compensator disposed in the optical path between one imaging apparatus and one eye of a user; respectively, generating first and second image beams by the two imaging apparatuses; and utilizing the optical compensator to modulate the wavefront of the first image beams.

BRIEF DESCRIPTION OF THE DRAWINGS

Other objects, advantages, and novel features of the present invention will become more apparent from the following detailed description when taken in conjunction with the accompanying drawings.

FIG. 5b shows a relationship diagram between the refractive index and the transversal position on the optical compensator in FIG. 5a.

DETAILED DESCRIPTION OF THE PREFERRED EMBODIMENT

Figure 2A:
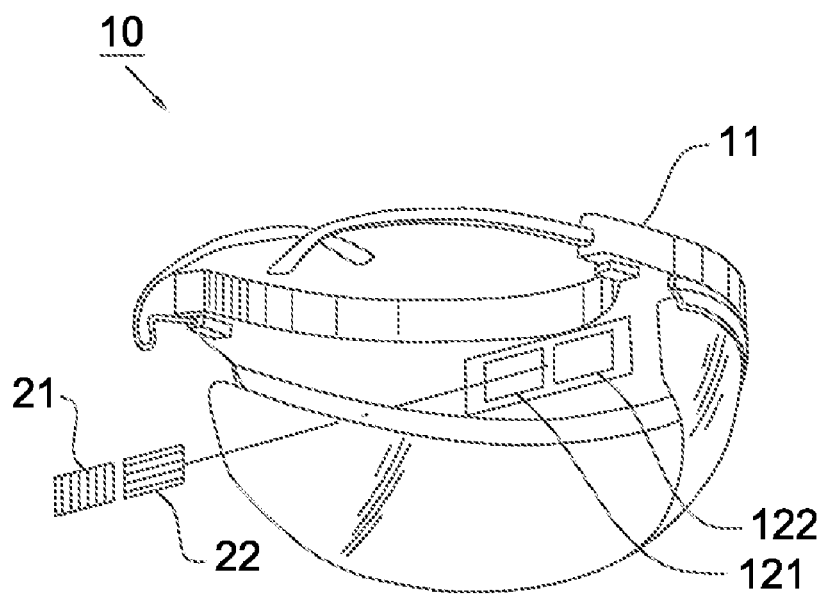
FIG. 2a shows a perspective view of a binocular head-mounted display according to one embodiment of the present invention.
Figure 2B:
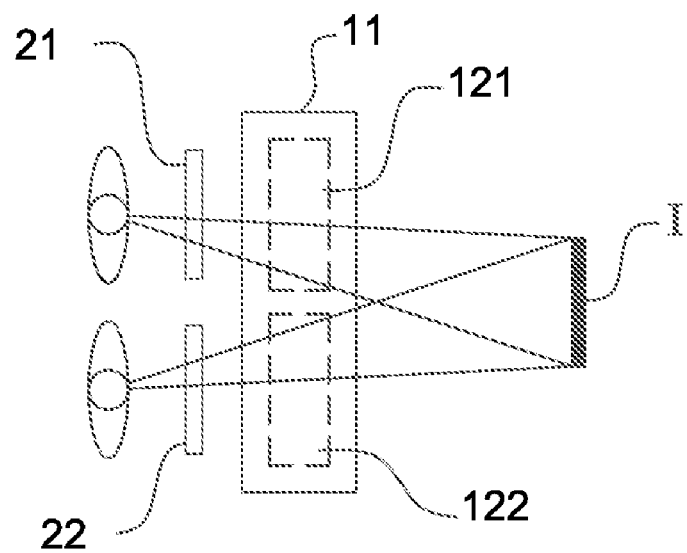
FIG. 2b shows a schematic diagram of a virtual image seen by a user through a binocular head-mounted display according to one embodiment of the present invention.

Referring to FIGS. 2a and 2b, they depict a head-mounted display 10 according to one embodiment of the present invention. The head-mounted display 10 is a binocular head-mounted display which includes a frame 11, two imaging apparatuses 121, 122 and two optical compensators 21, 22. The frame 11 is wearable on a user's head (not shown). Embodiments of the imaging apparatuses 121 and 122 include a liquid crystal display panel (LCD panel) and a liquid crystal on silicon panel (LCOS panel). The imaging apparatuses 121 and 122 are respectively integrated on the frame 11 and can form a virtual image "I" in front of two eyes of the user, as shown in FIG. 2b, wherein the distance of the virtual image "I" from the eyes of the user is designed differently according to different applications.

One embodiment of the optical compensators 21 and 22 is a liquid crystal compensator (LC compensator). The optical compensator 21 is disposed in the optical path between the imaging apparatus 121 and the left eye of the user, and the optical compensator 22 is disposed in the optical path between the imaging apparatus 122 and the right eye of the user, as shown in FIG. 2b. The optical compensators 21 and 22 are preferably disposed near to the eyes of the user. The optical compensators 21 and 22 can be manufactured as an individual optical component or be integrated onto the head-mounted display 10 according to different applications. In the embodiment of present invention, the optical compensators 21 and 22 modulate the wavefront of the image beams of the virtual image "I" so as to adjust positions of the virtual image "I" seen by the user. Their structures and detailed principles will be described in the following paragraphs.

Figure 3A:
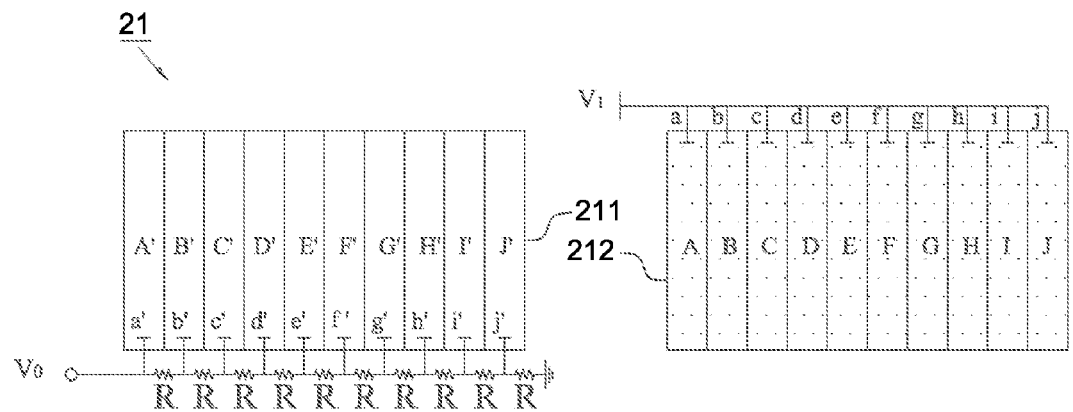
FIG. 3a shows a schematic diagram of the optical compensator of the binocular head-mounted display according to the embodiment of the present invention.

Referring to FIG. 3a, there is shown an embodiment of the optical compensator 21 of the present invention, which includes two transparent substrates 211, 212 and a plurality of pairs of electrodes a' to j' and a to j, i.e. one pair including the electrodes a' and a, another pair including the electrodes b' and b and so on. A plurality of transparent conducting layers A' to J' are disposed in line and adjacent with each other on the transparent substrates 211, and a plurality of transparent conducting layers A to J are disposed in line and adjacent with each other on the transparent substrates 212. The transparent conducting layer A' is preferably symmetric to the transparent conducting layer A; the transparent conducting layer B' is preferably symmetric to the transparent conducting layer B and so on. Transparent conducting layers A' to J' (A to J) are preferably displaced within the same distance interval and electrically separated from each other. In one embodiment, the transparent conducting layers A' to J' (A to J) are preferably formed as rectangular shape. The electrodes a' to j' are respectively electrically coupled to the transparent conducting layers A' to J' disposed on the transparent substrate 211, i.e. the electrode a' is electrically coupled to the transparent conducting layer A', and the electrode b' is electrically coupled to the transparent conducting layer B' and so on. The electrodes a to j are respectively electrically coupled to the transparent conducting layers A~J disposed on the transparent substrate 212, i.e. the electrode a is electrically coupled to the transparent conducting layer A, and the electrode b is electrically coupled to the transparent conducting layer B and so on. A liquid crystal layer (area with dots) is sandwiched between the transparent substrate 211 and the transparent substrate 212.

Figure 3B:
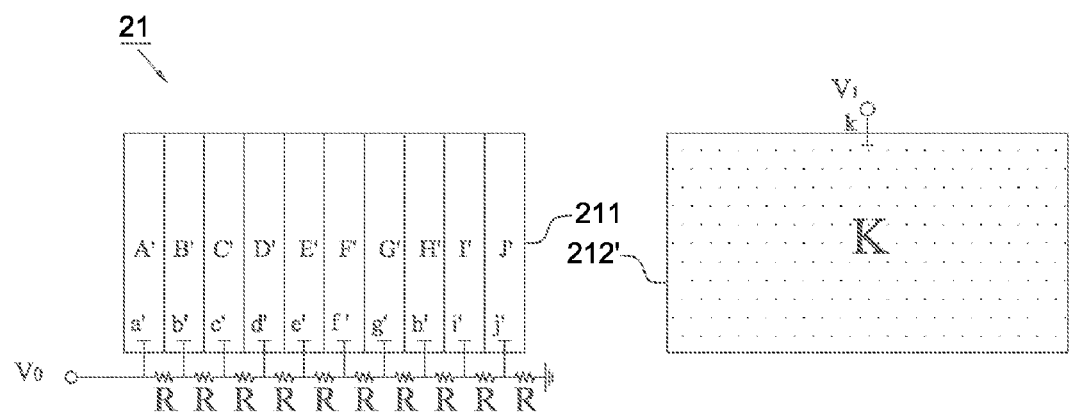
FIG. 3b shows another schematic diagram of the optical compensator of the binocular head-mounted display according to the embodiment of the present invention.

Referring to FIG. 3b, there is illustrated an alternative embodiment of the optical compensator 21 of the present invention, which also includes two transparent substrates 211 and 212'. A plurality of transparent conducting layers A' to J' are disposed in line and adjacent with each other on the transparent substrate 211 and a plurality of electrodes a' to j' are respectively electrically coupled thereto, i.e. the electrode a' is electrically coupled to the transparent conducting layer A', and the electrode b' is electrically coupled to the transparent conducting layer B' and so on. A transparent conducting layer K is disposed on the transparent substrate 212' and is electrically coupled to an electrode k. In addition, a liquid crystal layer (dotted area) is sandwiched between the transparent substrate 211 and the transparent substrate 212'.

Figure 3C:
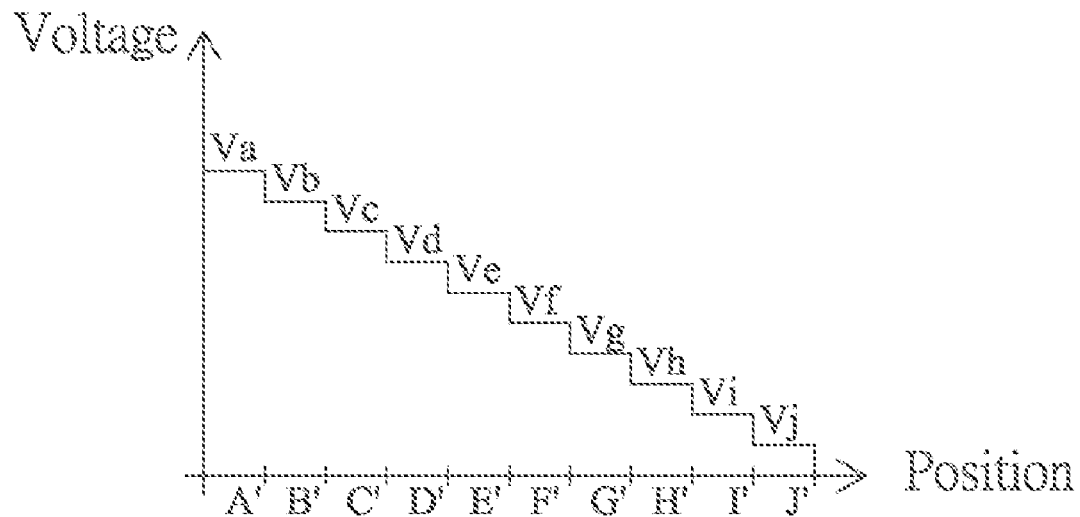
FIG. 3c shows a schematic diagram of voltage distribution on the optical compensator of the binocular head-mounted display according to the embodiment of the present invention.

Referring to FIGS. 3a to 3d, in the embodiments of the present invention, connecting a resistor R respectively between two adjacent electrodes will create monotonically varied potentials on the transparent conducting layers A' to J' through the electrodes a' to j', thereby changing the distribution of the refractive indices in the liquid crystal layer, as shown in FIGS. 3a and 3b. Preferably, all resistors R have identical resistances. In this manner, monotonically increased or decreased voltages can be formed on the electrodes a' to j' according to voltage division theorem such that monotonically varied potentials can be created on the transparent conducting layers A' to J' accordingly. In this embodiment, a voltage $V_0$ is connected to one terminal of the series resistors, which is formed by all resistors R connected in series, and the voltage $V_0$ is used as a voltage source for the electrodes a' to j'. The other terminal of the series resistors is connected to a voltage node, e.g. ground. The electrodes a to j are connected to a voltage $V_1$ simultaneously (the electrode k is connected to a voltage $V_1$ in FIG. 3b). In this manner, a monotonically varied voltages Va to Vj can be formed on the electrodes a' to j', e.g. voltage Va on the electrode a', voltage Vb on the electrode b' and so on. Then, potentials Va to Vj are respectively formed between the transparent conducting layers A' and A, B' and B, . . . , J' and J while $V_1=0$ (or between the transparent conducting layers A' to J' and K in FIG. 3b), and the voltage (potential) distribution is shown in FIG. 3c. Therefore, a plurality of electric fields can be formed in line and adjacent with each other between the transparent substrate 211 and 212 (212'). It should be understood that the above method is used for illustrative purpose and that any other method which can form a monotonically increased or decreased electric fields can also be implemented for the present invention and will not depart from the spirit of the present invention.

Figure 3D:
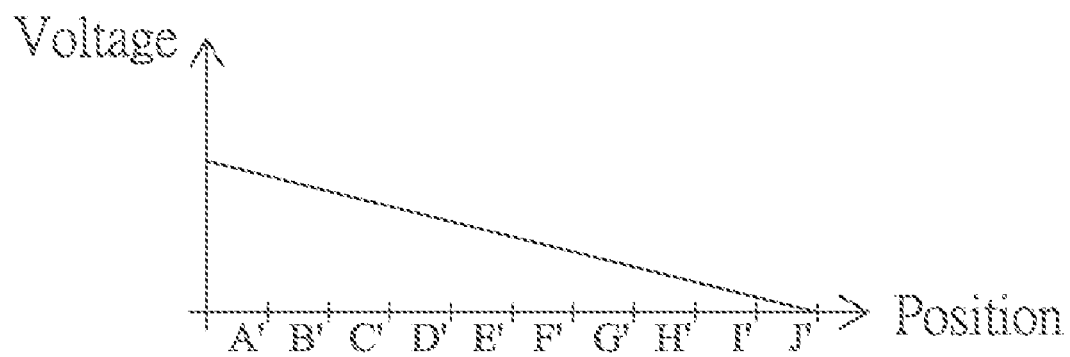
FIG. 3d shows another schematic diagram of voltage distribution on the optical compensator of the binocular head-mounted display according to the embodiment of the present invention.

For simplification, ten voltage stages are exemplarily given herein, but it is not the only embodiment of the present invention. In the actual practice, any number of the voltage stages (electric fields) may be designed such that the voltage can be formed as a substantial linearly distributed voltage, as shown in FIG. 3d. The electric potentials between the transparent conducting layers A' and A, B' and B, . . . , J' and J (or between the transparent conducting layers A' to J' and K) can be formed as a substantial linear distribution. In addition, it should be noted that although the descriptions herein are focused only on the optical compensator 21, the structures and operating principles of the optical compensator 22 are identical to those of the optical compensator 21, and their detailed description will not be repeated herein.

Figure 4:
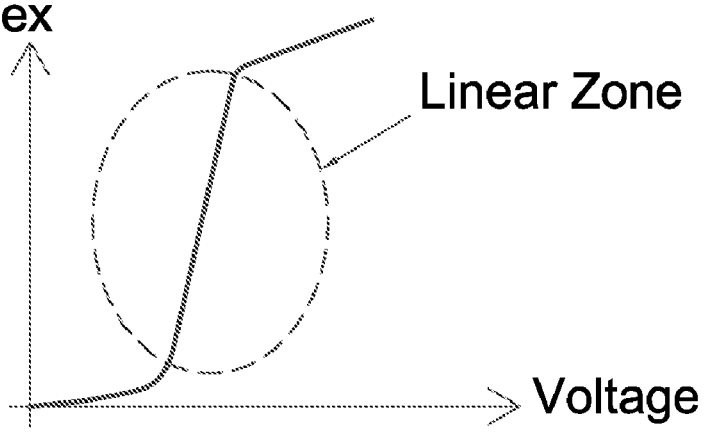
FIG. 4 shows a relationship diagram between refractive index of liquid crystals and voltage applied thereto.

Referring to FIGS. 3a to 3d and FIG. 4, FIG. 4 shows a relationship between the refractive indices of liquid crystal and the voltage applied thereto. The present invention utilizes the linear zone in the relationship diagram, as shown in FIG. 4, as a basis to alter voltages Va to Vj on the electrodes a' to j' and the refractive index distribution on the transparent conducting layers A' to J' simultaneously. Furthermore, the present invention utilizes the proportional relationship between optical path difference (OPD) and refractive index, as shown in equation (1) below, to change OPD of the beams transmitting through the same distance by changing refractive indices of the liquid crystal.

$$OPD = \Delta n \times d \quad (1)$$

wherein OPD represents optical path difference; $\Delta n$ represents refractive index; and d represents the distance through which beams transmit. As described above, once the number of the transparent conducting layers is large enough, when a voltage $V_0$ is added to one terminal of the series resistors, the distribution of the refractive indices of the liquid crystals can be formed as a substantial linear distribution.

It should be noted that the wavelength of the images beams can also affect the refractive index and further affect optical path difference. Therefore, the optical compensators 21 and 22 of the present invention are preferably adapted to a monochromatic imaging system. If the optical compensators 21 and 22 are desired to be utilized in a color imaging system, they are preferably implemented in a color sequential display system. By synchronizing the voltages used for altering refractive indices of liquid crystals with image subframes of different colors, i.e. the input voltages utilized to change refractive indices being corresponded to frame signals of different colors, the aberration between different color images can be eliminated.

Figure 5A:
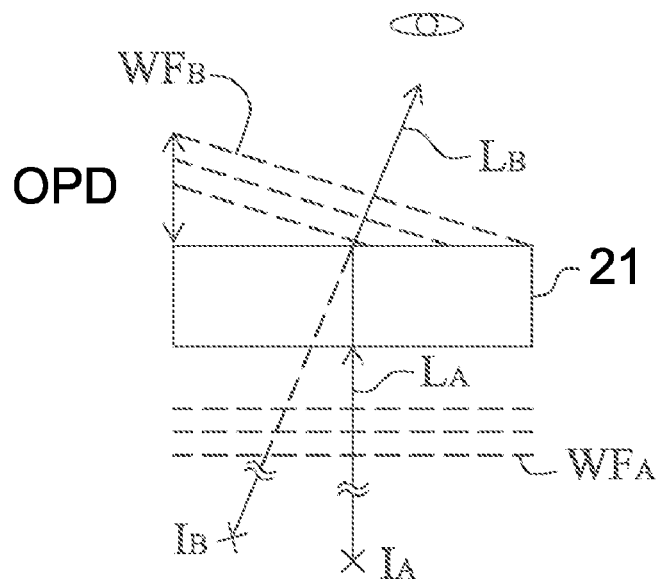
FIG. 5a shows a schematic diagram of the method to steer the optical path by modulating wavefront of the incident image beams by using the optical compensator of the binocular head-mounted display according to the embodiment of the present invention.
Figure 5B:
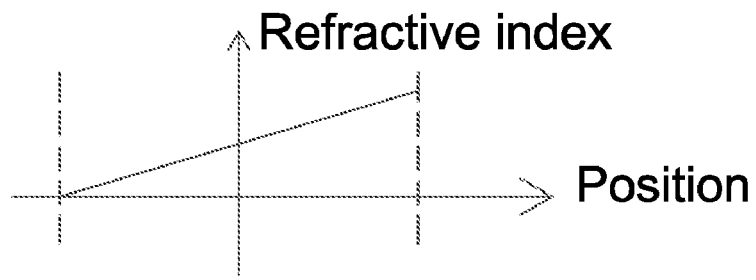

Referring to FIGS. 5a and 5b, there are shown the method to modulate the image beam wavefront by different voltage potentials created by the optical compensator 21 of the present invention. For convenience for explaining, the scale of the image beams and the optical compensator 21 as shown in the drawing are larger than their actual sizes. The followings will explain the function of the optical compensator 21 with an image beam $L_A$ incident to one side of the optical compensator 21 from a point $I_A$ far from the optical compensator 21. In this illustration, the point $I_A$ indicates one point of the virtual images "I", and all image beams from the point $I_A$ are considered as parallel optical beams, hence the wavefront $WF_A$ of the incident image beam $L_A$ is perpendicular to the transmitting direction of the image beam $L_A$. In order to change the optical path of the image beam $L_A$ transmitted through the optical compensator 21 to the image beam $L_B$, the present invention modulates the wavefront $WF_A$ of the incident image beam $L_A$ to the wavefront $WF_B$, and then the optical path of the image beam $L_A$ can be changed to $L_B$. That is, the optical path difference between the wavefront $WF_A$ and $WF_B$ is compensated by the compensator 21. The electric field regions on the transparent conducting layers A' to J' of the optical compensator 21 are transversally arranged in line, and the refractive indices along the transverse direction (horizontally with respect to the user) are varied corresponding to different electric fields applied on different intervals. In this embodiment, it is assumed that the electric fields are stronger in the right hand side of the optical compensator 21, as shown in FIG. 5a. In this manner, the optical path differences (OPD) vary corresponding to different electric fields applied to different interval, i.e. the OPDs are larger in the right hand side and smaller in the left hand side as in FIG. 5a. The wavefront $WF_A$ of the image beam $L_A$ outputted from the optical compensator 21 is changed to the wavefront $WF_B$. Since the transmitting direction of the image beam is perpendicular to the wavefront, the optical path is changed from $L_A$ to $L_B$. Meanwhile, the position of the virtual image formed by the image beam $L_A$ from the point $I_A$ will be changed to the point $I_B$ when watched by a user from the other side of the compensator 21. In this manner, by adjusting the varying scale of the voltages on the electrodes a' to j', the beam wavefront can be modulated so as to change transmitting direction of the image beam, and further to adjust the horizontal position of the virtual image "I". In addition, if it is desired to adjust the vertical positions of the virtual image "I", the distribution of the electric field regions on the optical compensator 21 has to be vertically arranged in line and adjacent with each other, i.e. the intensities of the electric fields is vertically varied with respect to the user. The user can utilize the same method for adjusting the horizontal positions described above to adjust the vertical positions of the virtual image "I". In this embodiment, since the structures and the operation principles of the optical compensator 22 are identical to those of the optical compensator 21, its detailed description will not be repeated again herein.

Figure 6A:
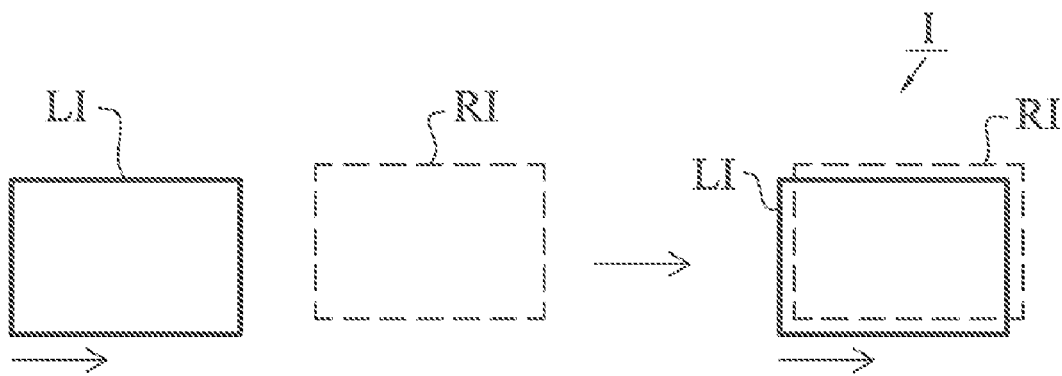
FIG. 6a shows a schematic diagram of virtual images seen by a user, wherein one of the virtual images is adjusted to move rightward by using the binocular head-mounted display according to the embodiment of the present invention.
Figure 6B:
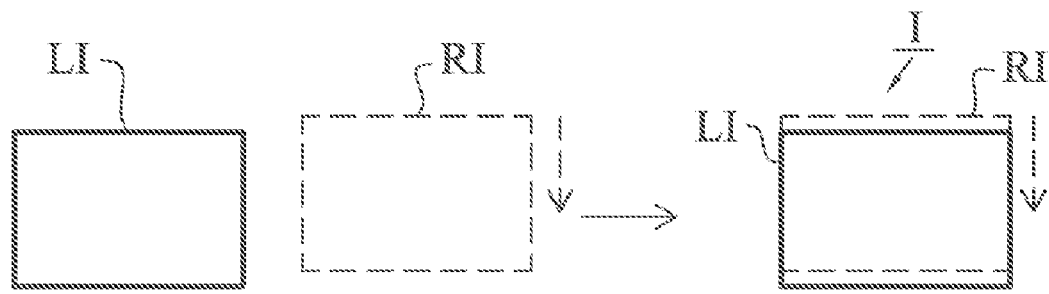
FIG. 6b shows a schematic diagram of virtual images seen by a user, wherein another one of the virtual images is adjusted to move downward by using the binocular head-mounted display according to the embodiment of the present invention.
Figure 6C:
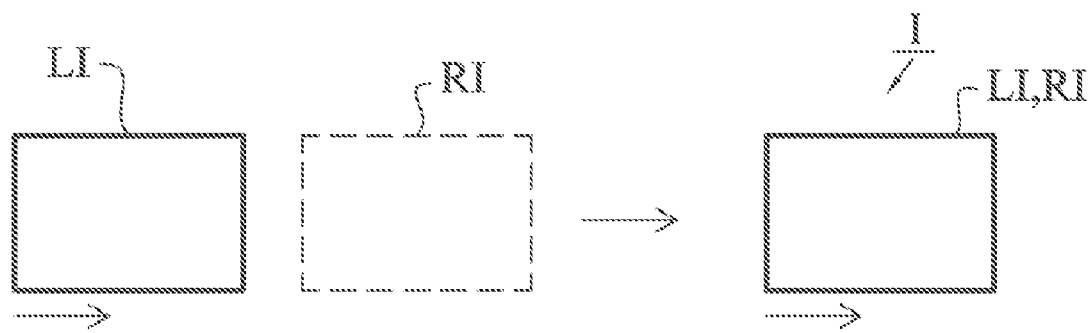
FIG. 6c shows a schematic diagram of virtual images seen by a user, wherein the virtual images have been adjusted to coincide with each other by using the binocular head-mounted display according to the embodiment of the present invention.

Referring to FIGS. 6a to 6c, there are shown the procedures to adjust the virtual image "I" by utilizing the optical compensators 21 and 22 according to the embodiment of the present invention. FIG. 6a shows two virtual images LI and RI formed in front of two eyes of a user by the head-mounted display 10, wherein LI represents the virtual image formed in front of the left eye of the user corresponding to the imaging apparatus 121 and RI represents the virtual image formed in front of the right eye of the user corresponding to the imaging apparatus 122. The user can see a virtual image "I" resulted from the virtual images LI and RI. Because of the manufacturing tolerances of the mechanisms and optical components of the head-mounted display 10, the virtual images LI and RI seen by the user may not coincide with each other, as shown in FIG. 6a. By utilizing the above mentioned method, the user can adjust the positions of the virtual images LI and RI by means of the optical compensators 21 and 22. It is assumed that, in this invention, one of the optical compensators 21 and 22, e.g. the optical compensator 21 corresponding to the left eye of the user, is utilized to adjust the horizontal position of the virtual image LI, i.e. the transparent conducting layers A' to J' are arranged horizontally in line and adjacent with each other. The other one of the optical compensators 21 and 22, e.g. the optical compensator 22 corresponding to the right eye of the user, is utilized to adjust the vertical position of the virtual image RI, i.e. the transparent conducting layers A' to J' are arranged vertically in line and adjacent with each other. First, the user adjusts the varying scale of the voltages on the optical compensator 21 to adjust the virtual image LI corresponding to the left eye of the user to move rightward to form a virtual image shown in FIG. 6b. Then, the user adjusts the varying scale of voltages on the optical compensator 22 to adjust the virtual image RI corresponding to the right eye of the user to move downward to form a virtual image shown in FIG. 6c. The adjustment procedures are finished after the virtual images are adjusted to coincide with each other. However, in actual practice, the sequence of the adjustment can be inverted or modified, i.e. performing the vertical adjustment of the virtual image first and then performing the horizontal adjustment, or only one of the imaging apparatus 121, 122 is utilized to adjust one of the virtual images to move upward, downward, rightward and leftward. For example, but not limited to, the user adjusts the positions of the virtual images LI formed by the imaging apparatus 121 corresponding to the left eye of the user and fix the position of the virtual images RI formed by the imaging apparatus 122, such that the virtual images LI and RI can be adjusted to coincide with each other within an acceptable range.

Figure 1A:
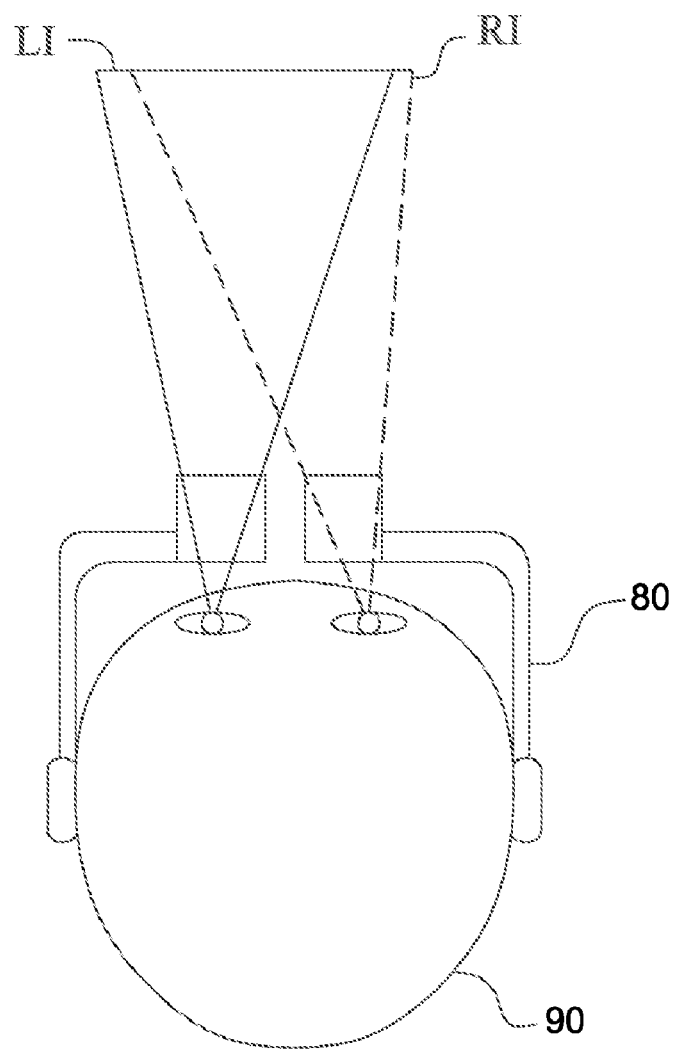
FIG. 1a shows a schematic diagram of a conventional binocular head-mounted display, which forms virtual images in front of two eyes of a user.
Figure 1B:
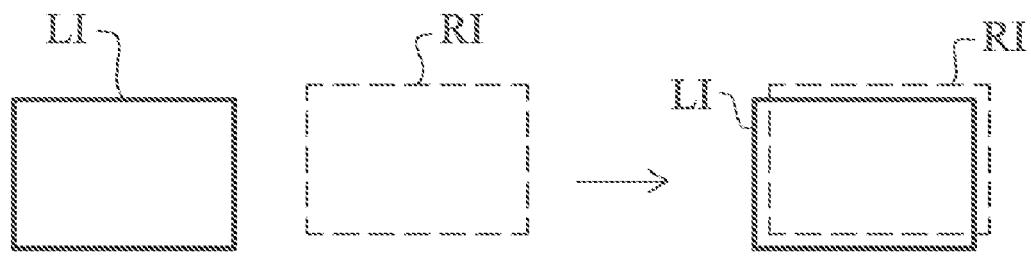
FIG. 1b shows a schematic diagram of the virtual images seen by a user.

As described above, since the conventional head-mounted display has the problems of dipvergence and convergence existing between two virtual images, it will cause the user to appear symptoms such as amblyopia, headache and nausea when using the display for watching pictures for a long period of time. Compared with the conventional art shown in FIG. 1a, the head-mounted display of the present invention, as shown in FIG. 2a, can be utilized to adjust the position of the virtual image by means of at least one optical compensator so as to reduce the complexity and the manufacturing cost of the head-mounted display.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. A head-mounted display, comprising:
    a frame wearable on a user's head;
    a first imaging apparatus integrated on the frame for creating a first virtual image composed of a plurality of image beams;
    a second imaging apparatus integrated on the frame for creating a second virtual image composed of a plurality of image beams; and
    a first optical compensator disposed in the optical path between the first imaging apparatus and one eye of the user for modulating wavefront of the image beams of the first virtual image;
    wherein the first optical compensator comprises a first transparent substrate, a second transparent substrate and a liquid crystal layer sandwiched therebetween, and a plurality of electric field regions are formed in line and adjacent with each other between the first and the second transparent substrates.

2. The head-mounted display as claimed in claim 1, wherein the field intensities of the adjacent electric field regions increase monotonically.

3. The head-mounted display as claimed in claim 1, further comprising a plurality of transparent conducting layers disposed on the first transparent substrate and a transparent conducting layer disposed on the second transparent substrate for generating the plurality of electric field regions.

4. The head-mounted display as claimed in claim 1, further comprising a plurality of transparent conducting layers disposed on the first transparent substrate and a plurality of transparent conducting layers disposed on the second transparent substrate, wherein each of the transparent conducting layer disposed on the second transparent substrate is respectively symmetric to one transparent conducting layer disposed on the first transparent substrate for generating the plurality of electric field regions.

5. The head-mounted display as claimed in claim 1, wherein the first and the second imaging apparatuses are LCD panels or LCOS panels.

6. The head-mounted display as claimed in claim 1, further comprising a second optical compensator disposed in the optical path between the second imaging apparatus and the other eye of the user for modulating wavefront of the image beams of the second virtual image, wherein the second optical compensator comprises a third transparent substrate, a forth transparent substrate and a liquid crystal layer sandwiched therebetween, and a plurality of electric field regions are formed in line and adjacent with each other between the third and the forth transparent substrates.

7. The head-mounted display as claimed in claim 6, wherein the plurality of electric field regions of the first optical compensator are formed horizontally in line so as to adjust the position of the first virtual image to move rightward and leftward while the plurality of electric field regions of the second optical compensator are formed vertically in line so as to adjust the position of the second virtual image to move upward and downward.

8. An optical compensator, comprising:
    a first transparent substrate;
    a second transparent substrate;
    a liquid crystal layer sandwiched between the first and the second transparent substrates; and
    a control circuit for creating a plurality of electric field regions, which are formed in line and adjacent with each other, between the first and the second transparent substrates, wherein the field intensities of the adjacent electric field regions increase monotonically.

9. The optical compensator as claimed in claim 8, further comprising a plurality of transparent conducting layers disposed on the first transparent substrate and a transparent conducting layer disposed on the second transparent substrate for generating the plurality of electric field regions.

10. The optical compensator as claimed in claim 8, further comprising a plurality of transparent conducting layers disposed on the first transparent substrate and a plurality of transparent conducting layers disposed on the second transparent substrate, wherein each of the transparent conducting layer disposed on the second transparent substrate is respectively symmetric to one transparent conducting layer disposed on the first transparent substrate for generating the plurality of electric field regions.

11. An image adjustment method for a head-mounted display, comprising the steps of:
    providing a head-mounted display, which comprises a frame, a first imaging apparatus and a second imaging apparatus integrated on the frame, and a first optical compensator disposed in the optical path between the first imaging apparatus and one eye of a user;

respectively generating a first image beam and a second image beam by the first and the second imaging apparatuses; and utilizing the first optical compensator to modulate wavefront of the first image beams.

12. The image adjustment method as claimed in claim 11, wherein the first optical compensator comprises a first transparent substrate, a second transparent substrate and a liquid crystal layer sandwiched therebetween, wherein a plurality of electric field regions are formed in line and adjacent with each other between the first and the second transparent substrates.

13. The image adjustment method as claimed in claim 12, wherein the field intensities of the adjacent electric field regions increase monotonically, and the step of modulate the wavefront of the first image beam comprises the step of: changing the varying scale of the field intensities between the adjacent electrical field regions.

* * * * *